(12) United States Patent
Toly (10) Patent No.: US 7,850,454 B2
(45) Date of Patent: Dec. 14, 2010

(54) SIMULATED ANATOMICAL STRUCTURES INCORPORATING AN EMBEDDED IMAGE LAYER

(76) Inventor: Christopher C. Toly, 3213 W. Wheeler St., #178, Seattle, WA (US) 98199

( * ) Notice: Subject to any disclaimer, the term of this patent is extended or adjusted under 35 U.S.C. 154(b) by 1869 days.

(21) Appl. No.: 10/932,407

(22) Filed: Sep. 1, 2004

(65) Prior Publication Data

US 2005/0026125 A1    Feb. 3, 2005

Related U.S. Application Data

(63) Continuation-in-part of application No. 10/718,492, filed on Nov. 20, 2003, which is a continuation-in-part of application No. 09/695,380, filed on Oct. 23, 2000, now Pat. No. 6,780,016.

(51) Int. Cl.
*G09B 23/28* (2006.01)

(52) U.S. Cl. .......................... 434/267; 434/262

(58) Field of Classification Search ......... 434/262–275; 446/72, 390–391, 269; 283/45; 700/97; 340/10.1; 43/2
See application file for complete search history.

(56) References Cited

U.S. PATENT DOCUMENTS

| | | | |
|---|---|---|---|
| 2,689,415 A | | 9/1954 | Haver |
| 2,763,070 A | * | 9/1956 | Mccormick .................. 434/273 |
| 2,871,579 A | | 2/1959 | Niiranaen et al. |
| 2,995,832 A | | 8/1961 | Alderson |
| 3,426,449 A | | 2/1969 | Van Noy, Jr. |
| 3,704,529 A | | 12/1972 | Cioppa ........................ 434/272 |
| 4,134,218 A | | 1/1979 | Adams et al. .................. 35/17 |
| 4,273,682 A | | 6/1981 | Kanamori .................... 252/511 |

(Continued)

FOREIGN PATENT DOCUMENTS

CH         646538 A     11/1984

(Continued)

OTHER PUBLICATIONS

"*The Good, The Bad, and The Ugly*" Target material. Kaman Measuring Systems, 2004, 3 pages. <http://www.kamansensors.com/html/technology/technology-tntargetmaterial.htm>.

(Continued)

*Primary Examiner*—Xuan M Thai
*Assistant Examiner*—Timothy Musselman
(74) *Attorney, Agent, or Firm*—Ronald M. Anderson (57) ABSTRACT

A simulated physiological structure includes an image layer configured to enhance a visual appearance of the simulated physiological structure. The image layer includes a substrate onto which an image has been printed. Preferably, the substrate is a relatively thin layer, compared to other layers of material in the simulated physiological structure. Where the simulated physiological structure includes surface irregularities, the substrate is preferably sufficiently thin so as to be able to readily conform to the surface irregularities. Particularly preferred substrates include fabrics, fibrous materials, meshes, and plastic sheets. The image, which can be of an actual anatomical element, or a rendering of an anatomical element, is transferred onto the substrate using conventional printing technologies, including ink jet printing. Particularly preferred images illustrate vascular structures and disease conditions. Preferably, the substrate is coupled to an elastomeric material that forms at least part of the simulated physiological structure.

12 Claims, 8 Drawing Sheets

U.S. PATENT DOCUMENTS

| | | | | |
|---|---|---|---|---|
| 4,323,350 | A | * | 4/1982 | Bowden, Jr. ............... 434/269 |
| 4,360,345 | A | | 11/1982 | Hon ............... 434/262 |
| 4,439,162 | A | | 3/1984 | Blaine |
| 4,459,113 | A | | 7/1984 | Gatti et al. |
| 4,481,001 | A | | 11/1984 | Graham et al. ............... 434/267 |
| 4,596,528 | A | | 6/1986 | Lewis et al. ............... 434/270 |
| 4,767,333 | A | | 8/1988 | Born |
| 4,773,865 | A | | 9/1988 | Baldwin |
| 4,789,340 | A | | 12/1988 | Zikria |
| 4,898,173 | A | | 2/1990 | Daglow et al. ............... 128/419 |
| 5,090,910 | A | | 2/1992 | Narlo |
| 5,104,328 | A | | 4/1992 | Lounsbury ............... 463/273 |
| 5,112,228 | A | | 5/1992 | Zouras |
| 5,137,458 | A | | 8/1992 | Ungs et al. |
| 5,149,270 | A | | 9/1992 | McKeown |
| 5,205,286 | A | | 4/1993 | Soukup et al. ............... 128/630 |
| 5,215,469 | A | | 6/1993 | Kohnke et al. |
| 5,320,537 | A | | 6/1994 | Watson |
| 5,322,729 | A | * | 6/1994 | Heeter et al. ............... 428/306.6 |
| 5,425,644 | A | | 6/1995 | Szinicz |
| 5,518,406 | A | | 5/1996 | Waters |
| 5,518,407 | A | | 5/1996 | Greenfield et al. |
| 5,573,501 | A | * | 11/1996 | Ruscito et al. ............... 602/7 |
| 5,609,615 | A | | 3/1997 | Sanders et al. ............... 607/36 |
| 5,620,326 | A | | 4/1997 | Younker |
| 5,722,836 | A | | 3/1998 | Younker ............... 434/272 |
| 5,734,418 | A | | 3/1998 | Danna ............... 348/76 |
| 5,754,313 | A | | 5/1998 | Pelchy et al. ............... 358/473 |
| 5,775,916 | A | | 7/1998 | Cooper et al. |
| 5,800,178 | A | | 9/1998 | Gillio ............... 434/262 |
| 5,832,772 | A | | 11/1998 | McEwan ............... 73/290 |
| 5,853,292 | A | | 12/1998 | Eggert et al. ............... 434/262 |
| 5,883,591 | A | | 3/1999 | McEwan ............... 342/22 |
| 5,947,743 | A | | 9/1999 | Hasson ............... 434/264 |
| 5,983,552 | A | * | 11/1999 | Nelson ............... 43/2 |
| 6,095,148 | A | | 8/2000 | Shastri et al. ............... 128/898 |
| 6,139,489 | A | | 10/2000 | Wampler et al. ............... 600/109 |
| 6,211,904 | B1 | | 4/2001 | Adair et al. ............... 348/76 |
| 6,234,804 | B1 | | 5/2001 | Yong ............... 434/267 |
| 6,256,012 | B1 | | 7/2001 | Devolpi ............... 345/161 |
| 6,270,491 | B1 | | 8/2001 | Toth et al. ............... 606/41 |
| 6,428,323 | B1 | | 8/2002 | Pugh ............... 434/274 |
| 6,436,035 | B1 | | 8/2002 | Toth et al. ............... 600/249 |
| 6,527,704 | B1 | | 3/2003 | Chang et al. ............... 600/112 |
| 6,532,379 | B2 | | 3/2003 | Stratbucker ............... 600/382 |
| 6,659,776 | B1 | | 12/2003 | Aumann et al. ............... 434/262 |
| 2001/0000187 | A1 | | 4/2001 | Peckham et al. ............... 607/48 |
| 2002/0126501 | A1 | | 9/2002 | Toth et al. ............... 362/552 |

FOREIGN PATENT DOCUMENTS

| | | |
|---|---|---|
| DE | 0 601 806 | 3/1993 |
| DE | 4212908 | 10/1993 |
| FR | 0 217 689 | 11/1986 |
| FR | 2 691 826 | 12/1993 |
| GB | 2 277 826 B | 11/1994 |
| WO | WO 93/14483 | 7/1993 |
| WO | WO 93/16664 | 9/1993 |
| WO | WO 93/21619 | 10/1993 |
| WO | WO 94/25948 | 11/1994 |
| WO | WO 98/58358 | 12/1998 |
| WO | WO 01/32249 | 5/2001 |

OTHER PUBLICATIONS

"*Variable Impedance Transducers*". Kaman Measuring Systems, 2004, 2 pages. <http://www.kamansensors.com/html/technology/technology-variable.htm>.

"*Differential Impedance Transducers*" Kaman Measuring Systems, 2004, 2 pages. <http://www.kamansensors.com/html/technology/technology-differential.htm>.

"*A Low-Power Hall-Effect Switch.* " Sensors Magazine, Jun. 1999. Christine Graham, 2 pages Allegro MicroSystems, Inc., USA <http://www.allegromicro.com/techpub2/3210/3210papr.htm>.

"*PIN SEN-S65 Magneto-Inductive Sensor.*" Mar. 2004, PNI Corporation, 5464 Skylane blvd., Santa Rosa, CA 95403-1084 USA. 1page. <http://www.pnicorp.com>.

"*Giant Magnetic Resistive Potentiometers with Strong Potentialities.*" (CORDIS focus, No. 45, Oct. 2003). 2pages <http://www.sensorsportal.com/HTML/Potentiometers_Projects.htm>.

"*Non-contact Thread Detection.*". (Sensor Applications, Application Story, Mar. 2002). 2 pages. <http://www.sensorland.com/AppPage049.html>.

"*The Hall Effect.*" How they Work, How Sensors Work—HART Protocol. Sep. 22, 2004. 2 pages. <http://www.sensorland.com/HowPage046.html>.

"*Technical Advances in Hall-Effect Sensing* ". (Product Description) Allegro® MicroSystems, Inc. Gilbert, Joe. 6 pages.

Catalog, Everest Medical Corporation, Minneapolis, MN Sep. 1994.

Catalog, Advanced Surgical, Inc., Princeton, N.J., At least as early as Apr. 1996.

Limbs & Things Ltd. Brocure, Bristol, England, Mar. 1, 2996, 18 pages.

*Product News*, Limbs & Things Newsletter, Nov. 1995, 4 pages.

\* cited by examiner

SIMULATED ANATOMICAL STRUCTURES INCORPORATING AN EMBEDDED IMAGE LAYER

RELATED APPLICATIONS

This application is a continuation-in-part of a copending patent application, Ser. No. 10/718,492, filed on Nov. 20, 2003, which itself is a continuation-in-part of prior application Ser. No. 09/695,380, filed on Sep. 23, 2000 (and issued as U.S. Pat. No. 6,780,016), the benefit of the filing dates of which is hereby claimed under 35 U.S.C. §120.

FIELD OF THE INVENTION

The present invention generally pertains to simulated physiological structures for use as medical training aids, and more specifically, to simulated physiological structures that include an image layer incorporated into the simulated physiological structure to enhance the realism of the simulated physiological structure.

BACKGROUND OF THE INVENTION

The use of simulated physiological structures for training medical students and for providing skill training to practicing physicians is widespread. Although cadavers have traditionally been beneficially employed for this purpose, cadavers are not always readily available and are not well suited for all types of training.

Simulated physiological structures should preferably be usable repeatedly and should provide a realistic training experience corresponding to what the trainee would experience if performing a procedure on an actual patient. The need for such simulators is significant, because they can provide valuable training that will lead to more effective treatment of patients. For example, medical personnel who administer emergency trauma care can greatly benefit from the training achieved using a simulated physiological structure. Training in administering trauma surgical procedures, which include those procedures that are usually performed on a person who has experienced some form of severe and, often, life-threatening injury, is particularly beneficial. Such procedures may aid in the diagnosis of a condition, or may provide immediate life-saving care until more complete medical treatment is available. The procedures might include clearing a blocked airway or draining accumulations of fluids from internal organs. While appearing to be relatively simple, if these procedures are performed improperly, the result can worsen a patient's condition, placing the patient at an even greater peril of death. By their nature, trauma procedures are usually performed under emergency conditions in which the person administering the care is under time-related stress. It is therefore useful to provide training methods and apparatus to fully prepare students and physicians in these procedures, so that the procedures can be performed properly, without delay, and under stressful conditions.

The use of a training model (such as a cadaver, an animal, or a simulator) is desirable to properly prepare a student or physician to perform procedures on a variety of patients. While anatomy follows general rules, variations based on sex, age, height, and weight are the norm. A surgical student should not just blindly follow directions such as "make an incision four inches long and two inches deep, starting at the navel." Normal variations, such as the amount of body fat on a specific patient, will significantly change the depth of fat tissue that must be incised to reach an internal organ. Surgeons must rely on their knowledge of general anatomy, and evident cues (e.g., visually noting whether the patient has a low or high percentage of body fat, or whether the patient is a child, an adult, a female, etc.) to determine the correct location and other variable parameters, before performing a procedure on a specific patient. The use of cadavers, animal models, and anatomically correct simulators enable surgical students and physicians to apply their knowledge of anatomy to develop experience in assessing these factors, so as to properly determine the proper parameters to be applied when executing a procedure on a live patient.

Figure 1:
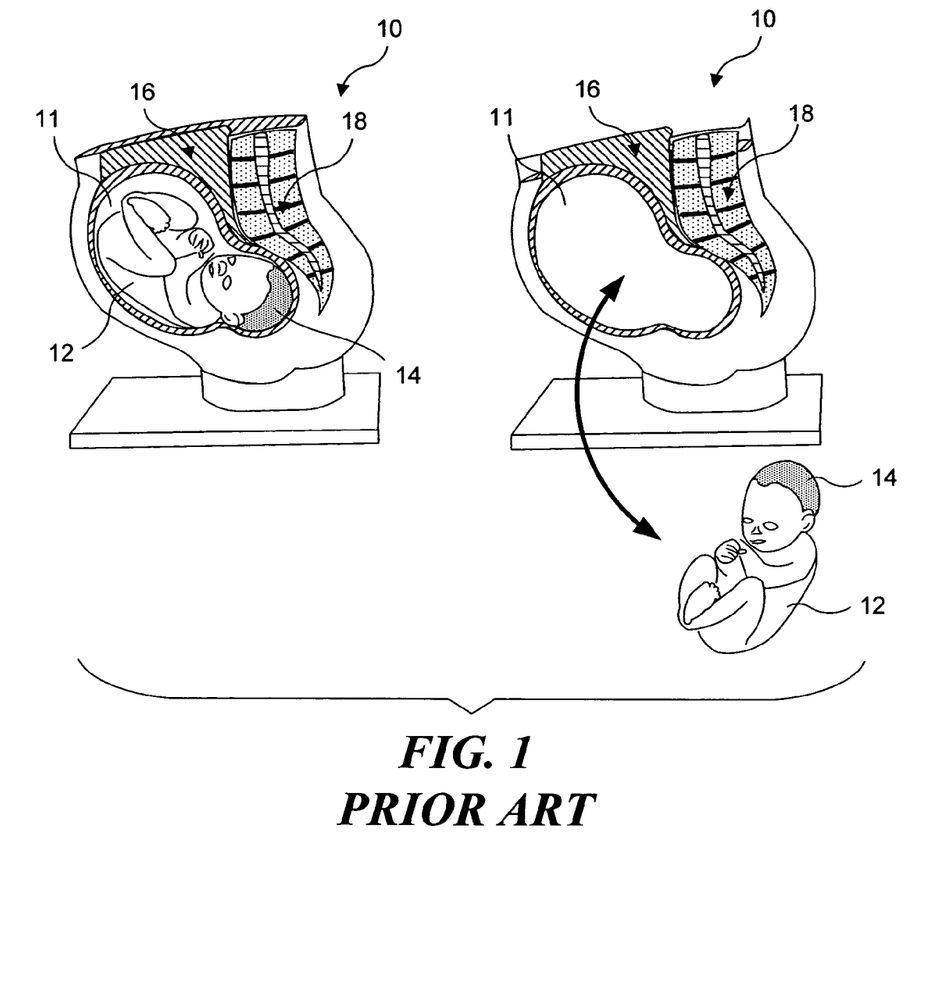
FIG. 1 (Prior Art) schematically illustrates a medical model having an image painted directly onto a hard plastic body form.

To provide the desired level of realism, a simulated physiological structure used for training medical personnel should both tactilely and visually resemble the anatomical structure being simulated. Some prior art medical models achieve part of this goal by being visually very realistic, but are formed of rigid plastic materials that have been painted to achieve a very realistic visual representation of a physiological structure. FIG. 1 schematically illustrates one such prior art model, which visually represents a female torso, including portions of the female reproductive system. A model 10 corresponds to a cut-away section of a female abdomen and includes a womb 11. A baby 12 rests in womb 11, and baby 12 can be removed to enable womb 11 to be more clearly inspected. Model 10 (and baby 12) are implemented using a generally flesh-tone colored hard plastic material. Anatomical details 16 and 18 of the cut away torso are painted onto the hard plastic, to achieve a very visually realistic model. Anatomical details, such as hair 14, are also painted onto baby 12. Model 10 is visually very realistic; however, the hard plastic material is not tactilely realistic.

Prior art human anatomical models have also been developed that employ elastomeric compositions for simulating human tissue. The elastomeric compositions can provide very realistic tactile sensations when incised and handled by a student. However, while elastomeric compositions can be colored to resemble human tissue, the subtle gradations in color present in actual human tissue have heretofore been difficult to reproduce using elastomers. Colored elastomers tend to exhibit uniform shading, whereas actual tissue exhibits significant color variations. Clearly, it would be desirable to provide a simulated physiological structure that is able to provide both more realistic tactile and visual queues to a student who is performing a simulated procedure.

SUMMARY OF THE INVENTION

One aspect of the present invention is directed to a simulated physiological structure that includes an elastomeric portion, and an image layer associated with the elastomeric portion. The present invention further encompasses a method of making such a simulated physiological structure. While elastomeric materials can realistically tactilely simulate soft tissues, from a visual perspective, elastomeric materials are not as lifelike as would be desired. Actual soft tissue has many subtle variations in color and shading and exhibits significant visual detail. Dyes and colors can be added to elastomeric materials to achieve a more lifelike appearance, but even such flesh-colored elastomeric materials are too uniform in appearance to be very lifelike. While rigid plastics can readily be painted, elastomeric materials cannot easily be painted to provide a real life appearance of tissue. In the present invention, an image of an appropriate anatomical feature is printed onto a substrate, and that substrate is incorporated into the simulated physiological structure.

Preferably, the substrate is a relatively thin layer, particularly as compared to other layers of material in the simulated physiological structure. Where the simulated physiological structure includes surface irregularities, the substrate is preferably sufficiently thin so as to be able to readily conform to the surface irregularities. Particularly preferred materials to form the substrate include fabrics, fibrous materials, mesh materials, and plastic sheets. The image can be formed onto the substrate using conventional printing technologies, including ink jet printing, and may include an image of an actual anatomical element, or a rendering (such as a drawing) of an anatomical element. It should be understood that the term rendering is intended to encompass artificial images generated by a person manipulating diverse types of media, including but not limited to pencil, ink, charcoal, and paint; as well as images generated with (or manipulated with) a computer (i.e. computer generated images). Particularly preferred images include images of a vascular structure and images of abnormal conditions (such as injuries or disease conditions). Preferably, the substrate is coupled to the elastomeric material. The image layer can also be covered with a protective layer of elastomeric material that is generally optically transparent (or at least, optically translucent).

A single simulated physiological structure can include a plurality of different image layers. For example, a simulated physiological structure representing a simulated tissue structure (and having dermal and sub-dermal tissue layers) includes a plurality of different layers of elastomeric materials. A plurality of image layers are preferably incorporated into such a simulated physiological structure to enhance the realism of the simulated physiological structure. A first image layer corresponds to skin, and includes variations in shading and color, as exhibited by real human skin. Preferably, the image layer will be printed onto a fabric substrate, using a real image of human skin as the source of the image. Such an image should include features normally associated with human skin, including such features as hair, freckles, variations in color and shading, and occasional imperfections, such as scars, bruises, abrasions, and tattoos. The resulting image layer is coupled to an elastomeric material selected to represent a dermal layer. If desired, a thin layer of relatively clear elastomeric material can be placed over the image layer, so that the upper surface of the simulated tissue structure has the tactile feel of tissue and does not look or feel like fabric. An image layer can also optionally include skin abnormalities such as wounds.

At least one additional image layer is preferably included in the simulated tissue structure. Those of ordinary skill in medical arts will readily recognize that traces of vascular structures can be seen through the dermal layer of the human body, particularly in individuals with lighter or translucent skin. Thus, a second image layer corresponding to the vascular structures normally found just below the dermal layer can be obtained, and printed onto a substrate. The first image layer (of the skin) is then coupled to an upper surface of the elastomeric layer simulating the dermal layer, while the vascular image layer is coupled to a lower surface of the elastomeric layer simulating the dermal layer. Although the elastomeric material simulating the dermal layer will obscure finer detail in the vascular image layer, that loss of detail is exactly what occurs in actual human tissue. Of course, various medical conditions or disease conditions can affect the amount of vascular structure that can be seen through the skin surface. Thus, a vascular image layer simulating varicose veins will be different than a vascular image layer simulating a normal venous structure.

The specific substrate selected for use in an image layer will be a function of the specific simulated physiological structure, and a disposition of the image layer with respect to the specific simulated physiological structure. In a simulated tissue structure, where such a simulated tissue structure is configured to be incisable, adding fibrous layers (having different thicknesses and textures) at selected positions can enhance the realism of the simulated tissue structure so that the simulated tissue structure responds to incisions much like real tissue. A fibrous layer can be included adjacent to the dermal layer, so that the dermal layer will provide more resistance to incision than a sub-dermal layer, which corresponds to softer tissue. Additional fibrous layers can be added deeper into the simulated tissue structure, to simulate serous membranes. Where an image layer is desired adjacent to a fibrous layer that is included to enhance a tactile response (for example, near the dermal layer), the substrate onto which the image is to be printed can be the fibrous layer selected to enhance the tactile realism of the simulated physiological structure. Also, where an image layer is desired, and no fibrous layer is needed for tactile response (or where inclusion of a fibrous layer would provide an unrealistic tactile response), a substantially non-fibrous substrate can be selected. For example, a plastic substrate can be used in place of a fabric or fibrous substrate. Presentations using overhead projectors often employ images and text that have been printed onto transparent plastic sheets (generally referred to as transparency films). Such transparent sheets can be used as a substrate material where a fibrous substrate is undesirable.

Selecting an image of tissue exhibiting a diseased or abnormal condition, for incorporating into an image layer enables very realistic training models to be achieved. For example, an image of a wound that penetrates the skin layer can be selected for an image layer. The image layer is then incorporated into a simulated tissue structure to achieve a simulated tissue structure that accurately visual depicts a wound. Because wounds often change the contours of the skin layers at the wound site, the contours of the wound can be reproduced in an elastomeric layer corresponding to a dermal tissue layer as it would appear if affected by an actual wound. The image layer is draped over the contoured elastomeric layer, so that the image of the wound is properly positioned relative to the contours of the elastomeric layer.

Images of disease conditions associated with organs can also be employed. For example, a simulated stomach might have an elastomeric layer simulating the lining of the stomach. An image of a stomach ulcer can be selected, and an image layer generated using this image. The resulting image layer is coupled to the elastomeric layer to achieve a realistically appearing simulated physiological structure (a model of a stomach including an ulcer). As noted above, if desired, the elastomeric layer simulating the stomach lining can include contours corresponding to those of a true ulcer. When the image layer is properly positioned relative to the elastomeric layer, the model can be used for video endoscopic training exercises. A student examining this model with a real or simulated endoscope can examine the interior of the stomach and discover a visually realistic appearing ulcer.

Another aspect of the present invention is directed to a method for making a medical training model that includes a simulated physiological structure having an elastomeric material and an image layer. One step of the method is to determine a physiological structure that the medical training model is to simulate. Then, an image corresponding to the physiological structure is selected. The selected image is printed onto a substrate to produce an image layer configured to enhance a visual realism of the medical training model, and the image layer is then integrated into the medical training model. Preferably, the image layer is coupled to the elastomeric material. Where the elastomeric material has an irregular surface, the image layer is sufficiently flexible so that the image layer conforms to the irregular surface.

Still another aspect of the invention is directed to providing an image layer in a simulated physiological structure that does not include elastomeric materials, but instead is fabricated using materials such as a rigid plastic.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Overview of the Present Invention

Medical models have been developed that provide very realistic tactile representations of tissue by incorporating layers of elastomeric materials that simulate dermal layers, muscle, fat, and other soft tissue structures, and organs. Such elastomeric materials can be dissected, much like actual tissue, and provide tactilely realistic sensations to the student. However, elastomeric materials cannot readily be painted to achieve a visually realistic model, the way that hard plastic materials can be, because paint does not adhere well to elastomeric materials, and does not produce a visually realistic effect.

In the present invention, an image layer is used to enable very visually realistic medical models to be achieved, even when elastomeric materials are used for creating the models. An image of an appropriate physiological structure is printed onto a substrate to generate an image layer. That image layer is then incorporated into a simulated physiological structure.

For example, assume a medical model of an esophagus is desired, and the model is to be used to enable a simulated examination of the esophagus using endoscopic techniques. Images of a real esophagus (or anatomically accurate renderings of an esophagus) are obtained. Those images are printed onto a substrate. A physiologically accurate model of an esophagus is produced, either in a hard material (such as a rigid plastic) or from an elastomeric material. The use of an elastomeric material results in a more realistic model, because if endoscopic tools are improperly employed, the elastomeric material be damaged, just as the soft tissue of an actual esophagus could be damaged. The image layer is then incorporated into the model, so that as the model is viewed using an endoscope (or a video/digital camera simulating an endoscope), the image obtained appears very realistic. As discussed in greater detail below, the images used to generate the image layer can include images of healthy tissue, images of diseased tissue, images of normal anatomical structures, images of abnormal anatomical structures, images of disease conditions, images of trauma, and images of wounds. Because the image layer is generated using real tissue subjects, and because the image layer is usable with elastomeric materials to simulate soft tissue, extremely detailed and both tactilely and visually realistic models can be achieved. While image layers in accord with the present invention are not required to be used with elastomeric materials that simulate soft tissues, the use of such elastomeric materials clearly enhances the tactile realism of the resulting model.

The following describes how image layers are used in a preferred simulated human tissue structure, in accord with the present invention, and how a surgical simulator using such a simulated human tissue structure is thus created. Additional examples show how image layers conform to irregular surfaces, illustrating how two-dimensional image layers are used to achieve a visually realistic three-dimensional model.

Exemplary Simulated Human Tissue Structure and Surgical Trainer

For the purposes of this description, human tissue, not including bone or cartilage, may be divided into two classes. The first class is tissue whose presence in a human body fills or lends significant bulk. The second class is tissue whose function is to line, support, or surround the first class of tissue. As used herein, the second class of tissue is thus referred to as a "membrane" or "membranes," or as "membranous tissue." By implication, the first class is also referred to as "sub-membranous tissue." Membranes are generally thinner, but are characterized in that they are comparatively more dense and tougher (to dissect) than sub-membranous tissue, due in part to their composite construction, since they typically include a fibrous layer. The types of membranes found in a human body include skin, serous membranes (such as the peritoneum, pericardium, or parietal pleura), and any of a number of fasciae or connective tissues, such as the deep fascia, which binds muscles (including the anterior and posterior rectus sheath or aponeuroses, ligaments, and tendons). By comparison, sub-membranous tissue, such as fat, muscle, or extraperitoneal tissue, occupies more space and is generally easier to dissect than membranes. However, even in different tissues that are sub-membranous, there can be a great disparity in tissue consistency. For instance, fat is much easier to dissect and has a very different tactile characteristic than muscle. In some instances, the blunt end of a scalpel can readily be employed to dissect fat. Given the need to provide realistic simulation and training models, it is therefore appropriate to impart a level of realism to surgical trainers to enable a user to experience the subtle differences between membranous and sub-membranous tissues, as well as to experience various types of each.

Figure 2:
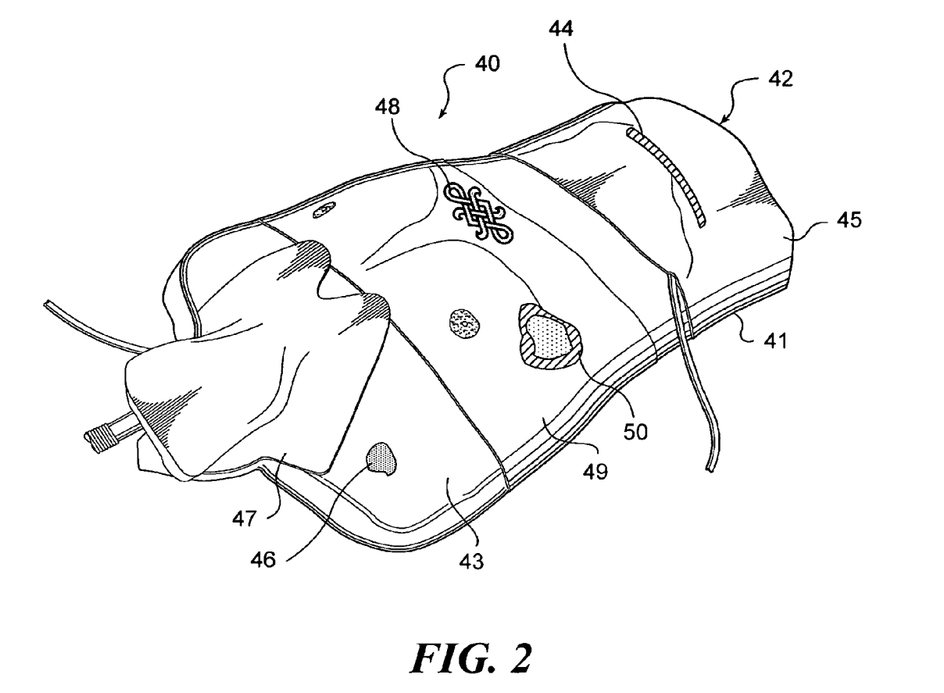
FIG. 2 schematically illustrates a simulated physiological structure in accord with the present invention, including a plurality of different image layers and a plurality of elastomeric layers, the image layers illustratively including a scar, a birthmark, a tattoo, and a wound, by way of example.

An exemplary surgical trainer constructed in accord with the present invention is shown in FIG. 2. The size and shape of trainer 40 are substantially proportional to those of a fully-grown average male torso. However, in another embodiment, surgical trainer 40 can alternatively be formed according to the size and the proportions of a fully-grown average female. In addition, in yet another embodiment, the trainer can be provided with size and the proportions of a small child or infant.

Trainer 40 rests on a base 41, which is preferably contoured to accommodate the trainer's dimensions. In addition, trainer 40 is buttressed by underlying structures, giving realistic shape and appearance to the trainer as though a complete muscular and skeletal system supports an exterior body cover 43. Body cover 43 includes an image layer (coupled to an elastomeric base or a hard plastic base) generated from images of actual human skin, to enhance the visual realism of surgical trainer 40. A lower boundary 42 of the trainer is roughly commensurate with the lower abdomen of an actual male. Parts of the hypogastric and iliac areas have been included, but the lower extremities have been omitted. From the lower abdomen, the trainer continues to follow the outline of an average-sized male torso. Lumbar and hypochondriac, medial and lateral areas, as well as umbilical and epigastric areas, are faithfully replicated. Trainer 40 concludes with the upper chest, which includes the upper neck portion. Upper extremities have been omitted. Preferably, the trainer includes swatches of simulated human tissue structure draped over practice surgery areas and over areas of body cover 43, and these swatches are preferably fastened to trainer 40 with hook and loop fasteners or snap fasteners (not shown), because the surgical practice tissue is incisable and is intended to be replaced after its useful life is expended. Thus, only the practice surgical swatches need be replaced instead of the entirety of body cover 43. Because body cover 43 is not intended to be incised, the image layer of body cover 43 can be coupled to a rigid plastic base. Preferably, the practice surgery areas include the abdomen, the chest, and neck areas. Each of the practice areas may include further simulated anatomical features and more tissue structure as described below.

The simulated human tissue structure covering the trainer includes at least one image layer. As discussed in detail below, the simulated human tissue structure includes a plurality of layers, including multiple layers of elastomeric material, to provide a realistic tactile sensation when the simulated human tissue structure is dissected or sutured. While the uppermost elastomeric layer can be dyed to achieve a flesh tone, the resulting color is very uniform, unlike the appearance of real skin, which exhibits subtle variations in color and shading, and which includes features and imperfections, such as freckles, abrasions, scars, tattoos, discolorations, and pores. In the present invention, an image layer is incorporated in the upper layers of the simulated human tissue structure, to provide a more realistic appearing skin layer. Because the skin layer is a membranous layer, the substrate selected is a fibrous material that imparts the desired structural properties to the skin layer. The substrate selected, when combined with an elastomeric material to achieve a composite layer simulating skin, should exhibit a tactile resistance to cutting similar to that of actual skin. A particularly preferred substrate for the composite skin layer is a nylon mesh.

The image selected for the skin layer will preferably be a photograph (or a digital image) of real skin, and will exhibit the natural imperfections (freckles, pores, blemishes, etc.) of real skin. In addition to including images of normal skin, the image layer of body cover 43 can also beneficially include additional elements, including a scar 44, a birthmark 46, a tattoo 48, and a wound 50. Scars and wounds are often three-dimensional relative to the smooth skin surface, but any image of a wound or a scar is only two-dimensional. To enhance the visual and tactile realism of the surgical simulator, the elastomeric layer combined with the image layer to achieve the composite skin layer can optionally be textured at the locations corresponding to wound 50 and scar 44. For example, an elongate ridge can be formed into the elastomeric material in the lower abdomen for simulating scar 44, while a generally circular depression can be formed into the elastomeric material in the center portion of the chest to replicate the three-dimensional appearance of wound 50. The image layer including the image of the scar is draped over the elongate ridge, so that the image of the scar is positioned over the ridge. Similarly, the image layer including the image of the wound is draped over the generally circular depression, so that the image of the wound is positioned over the depression. As long as the substrate on which the image is printed is sufficiently flexible, the image layer is able to conform to such surface irregularities.

Wound 50 is intended to simulate an open sore; however, it should be understood that various other types of wounds, such as a gun shot wound or a knife wound, could be beneficially incorporated into the skin layer. Where the image is of a gun shot wound, bullet fragments can be included in underlying portions of simulated tissue, so that the simulator can be used to train trauma surgeons to treat gun shots wounds, including removing such bullet fragments. While not specifically shown, it should be understood that the tissue layers can include fluid pockets, to simulate bleeding that will occur as the tissue is dissected. Furthermore, the simulator can include other fluid passages that are specific to such simulated wounds, to enable the simulated wounds to weep simulated blood, or other simulated body fluids.

While a skin layer including an image layer has been described in connection with trainer 40, which is limited to a torso, it will be understood that other trainers simulating other portions of a body (or even an entire body) can similarly benefit from incorporating an image layer, in accord with the present invention.

Still referring to FIG. 2, the trainer includes an abdomen surgical practice area with abdomen tissue 45. The abdomen area can be used to perform diagnostic peritoneal lavage. Trainer 40 includes a chest surgical practice area with a chest tissue structure 49. The chest area can be used to perform both the chest tube insertion procedure and pericardiocentesis. Preferably, both the chest area and the abdomen include the simulated tissue of FIG. 3 to cover the underlying simulated viscera. The simulated tissue of either area can be modified to incorporate a simulated wound, which requires treatment such as suturing, debris removal, and dressing.

Figure 3:
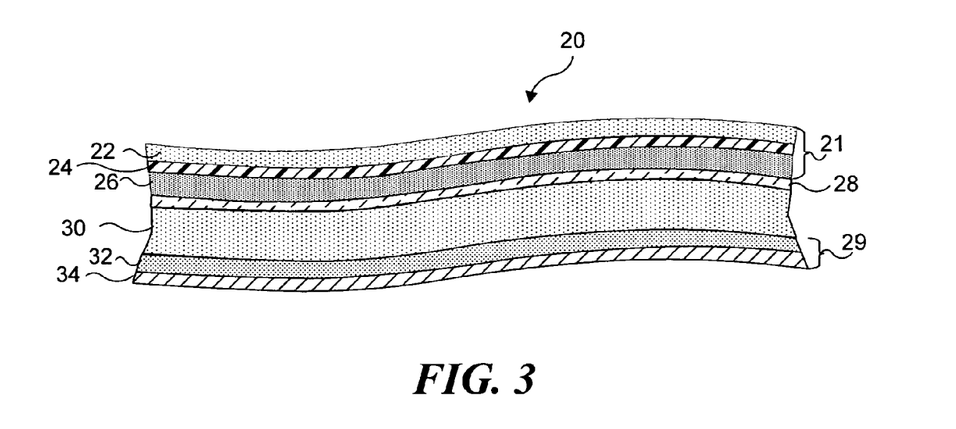
FIG. 3 schematically illustrates a simulated tissue structure in accord with the present invention, including a plurality of image layers and a plurality of elastomeric layers.

Trainer 40 includes a neck surgical practice area with neck tissue structure 47, and also preferably includes the simulated tissue structure of FIG. 3 to cover the underlying viscera. The neck area can be used to practice cricothyroidotomy. In addition, trainer 40 includes the underlying laryngeal cartilages and trachea in the neck area. While the tissue structure of FIG. 3 represents a preferred embodiment, other tissue structures made in accordance with the present invention are contemplated, that will maintain a correct human anatomy for a particular area, so that either more or fewer layers will be included, as required. While trainer 40 has been designed with certain surgical procedures in mind, the trainer is useful for the practice of other procedures involving those areas mentioned above.

Trainer 40 includes both exterior and interior structures and features that impart a lifelike quality to the trainer to better prepare medical students and other medical personnel for real operations or procedures. The exterior tissue members covering the surgical practice areas, of which there are preferably three, are incisable and suturable, because a fibrous layer is included within the simulated human tissue. Preferably, the simulated human tissue is secured to the trainer by hook and loop fasteners, or snap fasteners, or other suitable fasteners, thereby making the exterior tissue components readily replaceable at the end of their useful life. However, the fasteners are optional.

Referring now to FIG. 3, a preferred simulated human tissue constructed according to the present invention is shown. Alternates to the preferred embodiment may have more or fewer layers, to simulate the different anatomical features for a given area of the human body. A simulated human tissue structure 20 comprises the visible exterior in the surgical practice areas shown in FIG. 2. Simulated human tissue 20 of FIG. 2 preferably includes a number of layers of elastomeric compositions selected and configured to replicate the actual layered membranes and sub-membranes of a human body. The layers may be of similar formulation or they may be of different formulations, depending on the human tissue being simulated. For instance, simulated fat is of a different consistency than simulated muscle. As used herein, a stratum, or layer is used to denote a substantially uniform area extending in a longitudinal direction. Layers in the human tissue structure may be bonded to one another, or they may be individual layers that are placed atop one another without being bonded. Layers may even be separated by members that are not a part of the human tissue structure. Further, for any given surgical area, simulated human tissue 20 layers can vary in thickness.

Beginning with the uppermost and outermost layer, a composite layer 21 simulates human skin. For the purposes of this description, skin is considered a membranous layer. Composite layer 21 includes an elastomeric layer 26 and an image layer 24. Elastomeric layer 26 is preferably implemented using a silicone blend, which can be pigmented to generally achieve a flesh tone. As is generally known in the elastomer arts, any of a number of suitable pigments for coloring silicone blends can be used to visually represent different layers. The silicone used in the invention is preferably obtained from Silicones, Inc. of High Point, N.C., and is sold under the mark XP-153A™. Preferably, the silicone is mixed with a thinning agent, also obtained from Silicones, Inc., under the mark GI THINNER™. The volume ratio of silicone to thinner may be adjusted to achieve a suitable hardness and texture, but preferably, the volume ratio is between about 2:1 of silicone to thinner and about 10:1 of silicone to thinner. Techniques for molding and curing items of silicone and thinner are generally known by those of ordinary skill in the art and need not be set forth herein to enable the present invention. Although silicone has been found to perform best, other elastomeric materials, such as latex, may alternatively be used.

It should be noted that attaching an image layer to a silicone based simulated physiological structure requires care. In general, it is difficult to get a non silicone material to bond to a silicone material. One method of coupling an image layer to a silicone based simulated physiological structure involves coating the substrate with a silicone material (preferably after the image is formed on the substrate; however, coating the substrate with silicone before the image is formed is acceptable if the silicone does not interfere with the image formation). Such a silicone coated substrate can be coupled to a silicone based simulated physiological structure using a silicone compatible (preferably a silicone based) adhesive. Particularly when the silicone based simulated physiological structure is a simulated tissue structure, the image layer can be placed into a mold used to form a layer of the simulated tissue structure. A liquid silicone resin is introduced into the mold. Particularly when the image layer substrate is a fabric, the liquid silicone will move into the pores of the fabric, such that when the liquid silicone cures to form a solid mass, the image layer will be securely coupled to the silicone based simulated tissue layer. Where the substrate used in the image layer is non porous, the image layer can be suspended within the mold (for example, by using standoffs), such that the liquid silicone will flow around the substrate, substantially encapsulating the substrate in a mass of silicone. Particularly where the substrate is suspended within a mold such that only a relatively small distance separates an upper surface of the substrate from a bottom of the mold, only a thin layer of silicone will cover the upper surface of the substrate, and the image (formed on the upper surface of the substrate) will be easily visible through the thin layer of silicone (particularly when the silicone formulation cures to form a substantially clear mass).

Referring once again to FIG. 2, image layer 24 is formed by printing an image of skin onto a substrate. Because skin layer 21 represents a membranous layer, a reinforcing layer is combined with the elastomeric layer. Thus the image in image layer 24 is preferably printed onto a fibrous substrate, so that image layer enhances the realism of the simulated human tissue both tactilely and visually. Because the fibrous substrate used for image layer 24 will not provide the same generally smooth tactile sensation that real skin would, image layer 24 is preferably coated with an elastomeric layer 22 (preferably a silicone) and allowed to cure before attaching the image layer to elastomeric layer 26. Image layer 24 is then applied below or atop an uncured silicone formulation corresponding to elastomeric layer 26 while in a mold. As the silicone formulation for elastomeric layer 26 cures, elastomer-coated image layer 24 (i.e., elastomeric layer 22 and image layer 24) is bonded thereto. However, the elastomer coated image layer 24 need not be bonded to elastomeric layer 26. The substrate used in the image layer will impart a realistic resistance to cutting, similar to the resistance of real human skin. The substrate is preferably made of a nylon mesh material. However, other fabrics that perform equally well can alternatively be used. Any number of synthetic or natural fabrics are effective for use in this layer. While composite skin layer 21 is intended to be a very close approximation to actual human skin, it is to be recognized that real human skin includes numerous strata of virtually imperceptible differences. However, composite skin layer 21 of the present invention closely represents the epidermis and dermis of actual human skin. Preferably, a pigment is added in the silicone blend to color the skin similar to human skin so that as the skin layer is dissected, the color of the elastomeric material is suggestive of human tissue. Composite skin layer 21 is preferably about 2 millimeters to about 4 millimeters thick. While a preferred embodiment of composite skin layer 21 includes a single reinforcing image layer 24, other embodiments can utilize additional reinforcing layers (which may or may not include images printed on the reinforcing substrate).

Vascular structures are often partially visible through the skin. Simulated human tissue 20 thus preferably has an additional image layer 28, which includes an image of a vascular structure. While an actual image can be employed, because image layer 28 will be viewed through composite skin layer 21, a rendering (such as an artist's drawing) of a vascular structure can be employed without a significant loss in realism. If the simulated human tissue 20 is intended to simulate normal tissue, then relatively few veins in image layer 28 will be visible through composite skin layer 21. However, if simulated human tissue 20 is intended to simulate tissue exhibiting a venous disorder, such as varicose veins, then substantially more veins will be visible. Where image layer 24 provides sufficient reinforcement to the composite skin layer to impart a realistic resistance to incisions and dissections of the composite skin layer, then image layer 28 need not be a fibrous material that would provide additional reinforcement. In this case, the substrate employed for image layer 28 will be non fibrous. A plastic sheet, such as employed for the transparency films used for displaying text and graphics with over head projectors, can be beneficially used as a substrate for image layers that do not need to also provide structural reinforcement or support. Of course, if image layer 28 is required to provide additional reinforcement, then a fibrous substrate can be included in image layer 28.

Underlying composite skin layer 21 and image layer 28 is a layer 30 that simulates the subcutaneous fat found in actual human tissue. For purposes of this description, subcutaneous fat is considered a sub-membranous layer. Subcutaneous fat layer 30 is preferably formed of a silicone blend and includes a pigment. However, to simulate the less dense texture of fat, the formulation is adjusted to be different than that used for the layer simulating skin. The volume ratios used for the fat layer are preferably about 1:1 silicone to thinner, to about 2:1 silicone to thinner. Subcutaneous fat layer 30 is similar in texture and hardness (tactile sensation) to a layer of subcutaneous fat found in humans. In humans, the subcutaneous fat occurs as a thin layer of loose fatty tissue underlying the skin and binding it to underlying layers. It is optional to provide a fibrous material or fibrous layer in the subcutaneous fat and to add pigments. Preferably, subcutaneous fat layer 30 is from about 10 to about 60 millimeters thick. It will be appreciated, therefore, that the relative thicknesses of layers in simulated human tissue 20 are not drawn to scale.

Underlying subcutaneous fat layer 30 is a composite layer representing an anterior rectus sheath layer 29. For purposes of this description, the anterior rectus sheath is considered a membranous layer. The anterior rectus sheath layer includes an elastomeric layer 32 (preferably a silicone blend) and a reinforcing silicone-coated fibrous layer 34. Preferably, the fibrous material is a nylon mesh; however, SPANDEX™ material has also been found to perform well for this layer. Fibrous layer 34 is pre-formed and bonded to elastomeric layer 32 using the method described above. However, elastomeric layer 32 can instead be provided as a non-bonded layer. The formulation of silicone and thinner used to form anterior rectus sheath layer 29 is preferably in the range of about 1:0 silicone to thinner, to about 2:1 silicone to thinner. Silicone alone (with no thinner) may be used for this layer, because the rectus sheath is a dense, tough serous layer, and these characteristics can be achieved by using little or none of the thinner.

Preferably, the silicone used for elastomeric layer 32 is of a different consistency than that used for composite skin layer 21 or subcutaneous fat layer 30. The silicone preferably used for producing anterior rectus sheath layer 29 is obtained from Silicones, Inc. under the name GI-1000A™. This formulation of silicone is of a higher specific gravity, and therefore, upon curing, will be denser than skin layer 21 or subcutaneous fat layer 30. For the sake of comparison, the lighter silicone, XP-153A™, has a specific gravity of about 0.98, while the more dense silicone, GI-1000A™, has a specific gravity of about 0.99. Preferably, anterior rectus sheath layer 29 is from about 0.5 to about 1.5 millimeters thick, and more preferably, about 1.0 millimeter thick. While a preferred embodiment of anterior rectus sheath layer 29 includes a single reinforcing silicone-coated fibrous layer 34, additional reinforcing layers can also be used. Also, though reinforcing silicone-coated fibrous layer 34 described above does not include an image, if it is determined that including an image on anterior rectus sheath layer 29 would enhance the realism of simulated human tissue 20, then an image can be printed onto the fibrous layer before it is coated with silicone (or another elastomeric material). If desired, simulated human tissue 20 can include additional underlying layers, such as a muscle layer and additional membranous layers (neither shown).

Figure 4A:
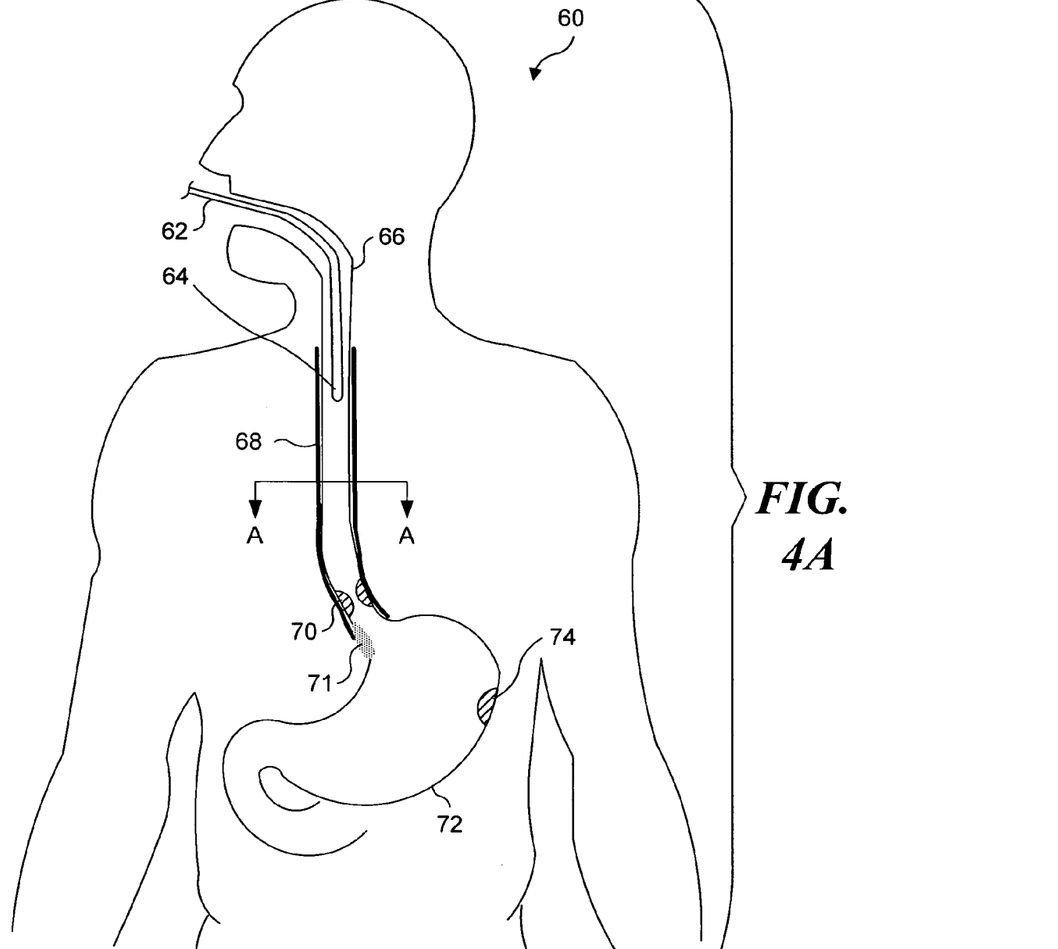
FIG. 4 schematically illustrates a medical training model including image layers conforming to irregular surfaces to achieve a simulated esophageal constriction, and a simulated gastric ulcer.

FIG. 4A illustrates a medical training simulator 60 including a simulated esophagus 68 and a simulated stomach 72. Esophagus 68 includes an esophageal stricture 70 and simulated abnormal esophageal tissue 71. Abnormal esophageal tissue and esophageal strictures are commonly associated with gastroesophageal reflux disease (GERD), a very common disorder. GERD occurs when the sphincter muscle at the bottom of the esophagus (not shown in FIG. 4A) relaxes and regularly allows stomach acid into the esophagus. GERD is characterized by symptoms and/or tissue damage resulting from repeated or prolonged exposure of the lining of the esophagus to stomach acid. One type of tissue damage that can occur is referred to as Barrett's esophagus, in which the normal tissue lining the esophagus is replaced by tissue normally found in the stomach (i.e., acid-resistant tissue). While the tissue replacement may be a defense mechanism, the presence of such abnormal tissue within the esophagus has been clinically identified as being a risk factor for adenocarcinoma (cancer of the lower esophagus). Thus, abnormal esophageal tissue 71 is associated with Barrett's esophagus. A second type of tissue damage associated with GERD is an esophageal stricture. The lower esophagus can open to the size of a quarter or wider. When recurrent inflammation occurs in the esophagus, scarring develops, underlying tissues becomes fibrous, and the opening narrows. In advanced cases, this narrowing, or stricture, can be severe. The opening may be reduced to the size of a pencil or even smaller. Food and fluid are delayed and only move slowly across the opening into the stomach. A large piece of food, such as meat, may completely block the esophagus. Thus, esophageal stricture 70 is associated with GERD.

Esophagus 68 includes an image layer. Preferably the image layer is generated from images of an actual esophagus, so that an endoscope or simulated endoscope can capture extremely realistic images from esophagus 68. For example, a distal end 64 of simulated medial instrument 62 can include a digital camera or an optical fiber coupled to a digital camera or video camera external to medical training simulator 60. When the internal surfaces of esophagus 68 are covered with an image layer generated from actual images of an esophagus, any images captured from within esophagus 68 will be extremely realistic.

Figure 4B:
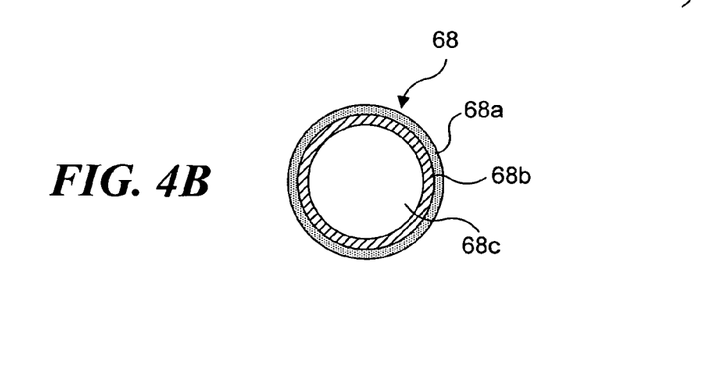

FIG. 4B is an enlarged cross section of esophagus 68 taken along line A-A. An image layer 68b is disposed around the internal circumference of a generally tubular wall 68a. Preferably, wall 68a is formed of an elastomeric material, so that if simulated medical instrument 62 is misused, damage to wall 68a can occur. If desired however, wall 68a can be implemented using a rigid plastic, or other rigid material. Esophagus 68 is formed by providing wall 68a as a sheet, and then coupling image layer 68b to an upper surface of the sheet. The sheet is rolled to form a tube, with the image layer disposed on the inside surface of the tube. Esophagus 68 includes a central orifice 68c, having a size and shape corresponding to the dimensions of an actual esophagus. Esophageal stricture 70 can also be implemented by adding a three-dimensional ridge to wall 68a, and using a substrate for image layer 68b that is sufficiently flexible to conform to the surface irregularity. To enhance the realism of esophageal stricture 70, image layer 68b preferably includes an image of an actual esophageal stricture at the corresponding location. Abnormal esophageal tissue 71 may require an irregular surface for wall 68a, depending on the type of abnormal tissue to be simulated. Again, image layer 68b preferably uses an actual image of abnormal esophageal tissue for the portion of the image layer that will correspond to abnormal esophageal tissue 70.

It should be noted that it will be difficult, if not impossible, to find a single actual image of an esophagus that includes an esophageal stricture, abnormal tissue, and a substantially 360 degree view of the entire esophagus. Those of ordinary skill in the art will readily recognize that digital imaging programs exist that stitch together a plurality of discrete digital images to form a panoramic image. Image layer 68b is thus preferably generated by assembling a synthesized digital image, and printing the resulting digital image on a substrate. Because esophagus 68 is not intended to be incised or sutured in the fashion that simulated human tissue 20 of FIG. 3 is, the substrate used to generate the image layer is not required to be a fibrous substrate. If for some reason, it is desirable for image layer 68b to provide reinforcement or structural support, then a fibrous substrate (such as a fabric) can be selected. While not shown in FIG. 4B, image layer 68b can be coated with an elastomeric layer, as discussed above in connection with simulated human tissue 20 of FIG. 3. To achieve a durable model that can be used repeatedly, even when trainees improperly use simulated instrument 62, such a protective coating may be preferred.

Medical instruments may be inserted into the esophagus to perform diagnosis or simulated treatment related to GERD. The medical instrment can provide images to the physician, since the tissue associated with Barrett's esophagus is readily identifiable. The medical instruments may also be used to obtain a biopsy of abnormal tissue in the esophagus, to determine if any of the abnormal tissue is cancerous. Medical instruments inserted in the esophagus can be used to dilate a stricture. One dilation technique involves positioning a deflated balloon within the stricture, then inflating the balloon to dilate the opening. Simulated medical instrument 62 can thus be configured to simulate an endoscope, a tissue sampler, or a dilator.

In a simulated diagnostic procedure, a student will view images of esophagus 68 captured by a camera or by an optical fiber disposed on distal end 64 of simulated medical instrument 62. The student will examine esophagus 68 and may be graded based on the student's ability to observe and identify esophageal stricture 70 and simulated abnormal esophageal tissue 71. In a simulated biopsy, a sensor may be disposed on distal end 64 of simulated medical instrument 62, so that the sensor responds to a circuit or object disposed at esophageal stricture 70 and simulated abnormal esophageal tissue 71, to determine if the student has properly positioned simulated medical instrument 62 relative to esophageal stricture 70 and simulated abnormal esophageal tissue 71 (such that a biopsy can be taken). In a simulated dilation procedure, the stricture can be formed using a fluid-filled bladder underlying the image layer, and the distal end 64 of simulated medical instrument 62 includes a balloon of sufficient strength to expand esophageal stricture 70 (i.e., the dilation forces fluid out of the bladder into a reservoir, enabling the stricture to be reduced in size). Fluid can then be forced from the reservoir back into the bladder, increasing the size of the stricture so that the dilation procedure can be simulated repetitively. Note that the dilation procedure is similar to balloon angioplasty, and that the same principles can be employed to simulate balloon angioplasty in an appropriately configured simulated physiological structure.

Referring again to FIG. 4A, simulated stomach 72 includes a simulated ulcer 74. In one embodiment, stomach 72 is formed of elastomeric materials, so that ulcer 74 can be physically removed, and incisions and dissection of other stomach tissue can occur. In another embodiment, stomach 72 is formed of a rigid material, such as plastic. The external shape of stomach 72 is largely irrelevant; the most important aspect of stomach 72 is that stomach 72 defines an internal volume, generally sized and shaped like an actual human stomach (or animal stomach, if a veterinary trainer is desired). An image layer covers substantially the entire inner surface of stomach 72. While it is possible to include an image layer in only a portion of stomach 72 (or esophagus 68), a more useful trainer is achieved if the entire simulated physiological structure accessible to the trainer includes an image layer, so that any portion visible to the student is as visually realistic as possible. If the tissue of stomach 72 is intended to be dissected or incised, then the substrate used to form the image layer can be a fibrous substrate, as discussed above. The portion of stomach 72 corresponding to ulcer 74 can be formed to exhibit an irregular surface consistent with the texture and shape of an actual ulcer, such that the image layer conforms to the irregular surface.

It should be understood that other disease conditions (or abnormalities, such as an injury) and tissue types can be included in esophagus 68 and stomach 72, and that the esophageal strictures, the gastric ulcer and abnormal tissue discussed above are simply exemplary and not limiting on the scope of the present invention. Furthermore, those of ordinary skill in the art will recognize that image layers in accord with the present invention can be incorporated into other medical training models involving other portions of the anatomy and other organs, including but not limited to the skull, the urinary tract, the female reproductive system, the intestines, the lungs, the heart, and the bowel, and rectum.

FIGS. 5A-5D schematically illustrate how an image layer 80 including a specific portion of interest 86 can be conformed to a physiological structure 90 including an irregular surface 94, such that the specific portion of interest overlays the irregular surface (e.g., so an image of a scar overlays a ridge, an image of a wound overlays a depression, or an image of a stricture overlays a protrusion).

Figure 5A:
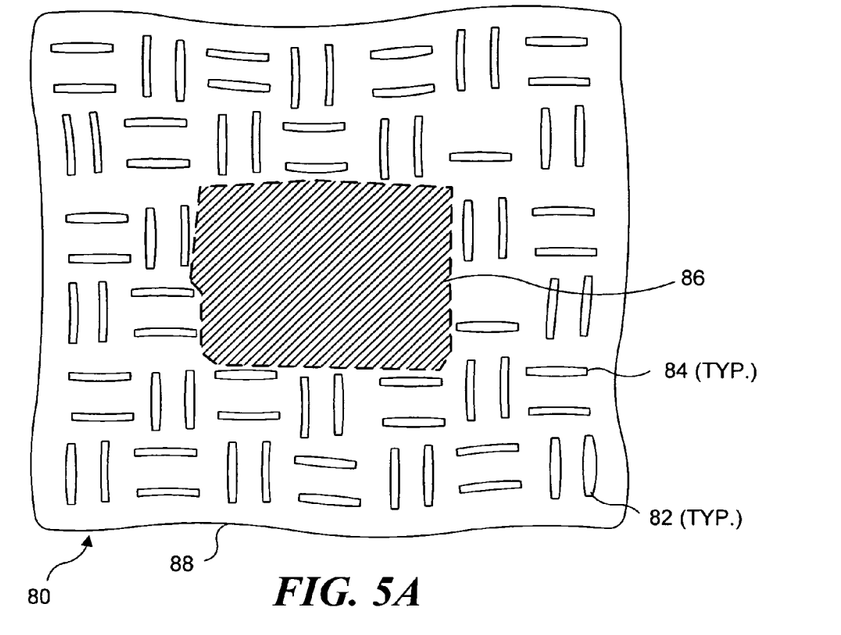
FIGS. 5A-5D schematically illustrate an image layer including an image printed onto a substrate being coupled to a simulated physiological structure including an irregular surface, such that the image layer conforms to the irregular surface.

In FIG. 5A, image layer 80 is generated when an image is printed onto a substrate 88. The image printed onto substrate 88 includes at least one specific portion of interest 86 and may include a plurality of portions of interest. The portion of interest may be indicative of disease conditions, such as an image of a wound, an ulcer, a tumor, or some other image of particular importance. Other portions of the image, such as portions 82 and portions 84, contribute to the overall realistic appearance of image layer 80, but are not of particular importance. For example, if image layer 80 is based on an image of human skin, then portions 82 and 84 corresponds to features such as pores, freckles and variations in shading and tone, while specific portion of interest 86 likely corresponds to a wound, a scar, a tumor, or some other abnormality.

Figure 5B:
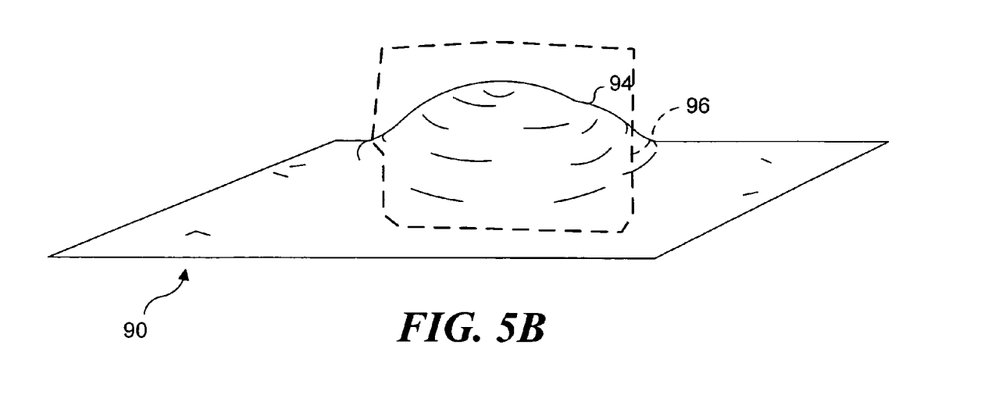

Referring now to FIG. 5B, simulated physiological structure 90 includes irregular surface 94, which as shown protrudes from physiological structure 90 (simulating for example, a mass of abnormal tissue such as a tumor), but could just as well be a depression instead of a protrusion (to simulate a wound), and can be implemented in different sizes and shapes. Physiological structure 90 can include a plurality of layers of elastomeric material (such as simulated human tissue 20 of FIG. 3), can be fabricated as a substantially uniform mass of an elastomeric material, or can be formed of a more rigid material, although the use of a more rigid material does not facilitate the incision or dissection of physiological structure 90. FIG. 5B includes a portion 96, generally corresponding to where portion of interest 86 from image layer 80 preferably will be positioned.

Figure 5C:
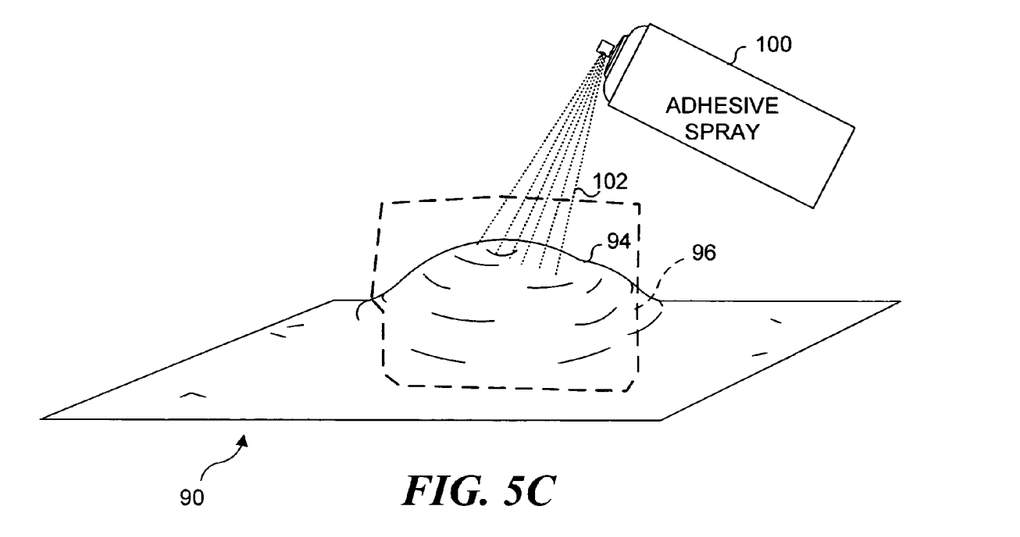
Figure 5D:
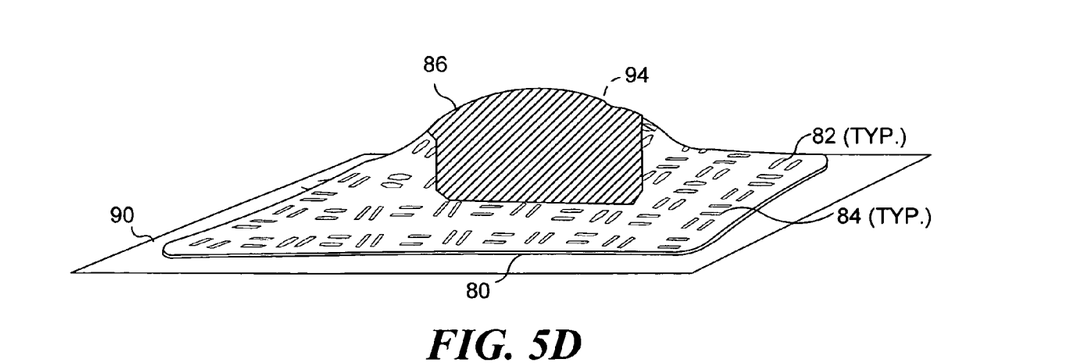

In FIG. 5C, an upper surface of simulated physiological structure 90 is covered with an adhesive 102 (for example, an adhesive applied with an aerosol can 100, such as is commonly available). It should be noted that other methods of coupling image layer 80 to physiological structure 90 can be employed, and the use of an adhesive spray is intended to be exemplary, and not limiting. Next, in FIG. 5D, image layer 80 is attached to physiological structure 90, so that specific portion of interest 86 substantially overlays irregular surface 94. Some substrates may be available with an adhesive backing, so that to attach the substrate to the physiological structure, it is only necessary to remove the adhesive backing. The specific substrate selected for image layer 80 should be sufficiently thin and flexible that image layer 80 is able to conform to irregular surface 94. Fabric substrates, as well as plastic sheets, generally exhibit the required flexibility.

Figure 6:
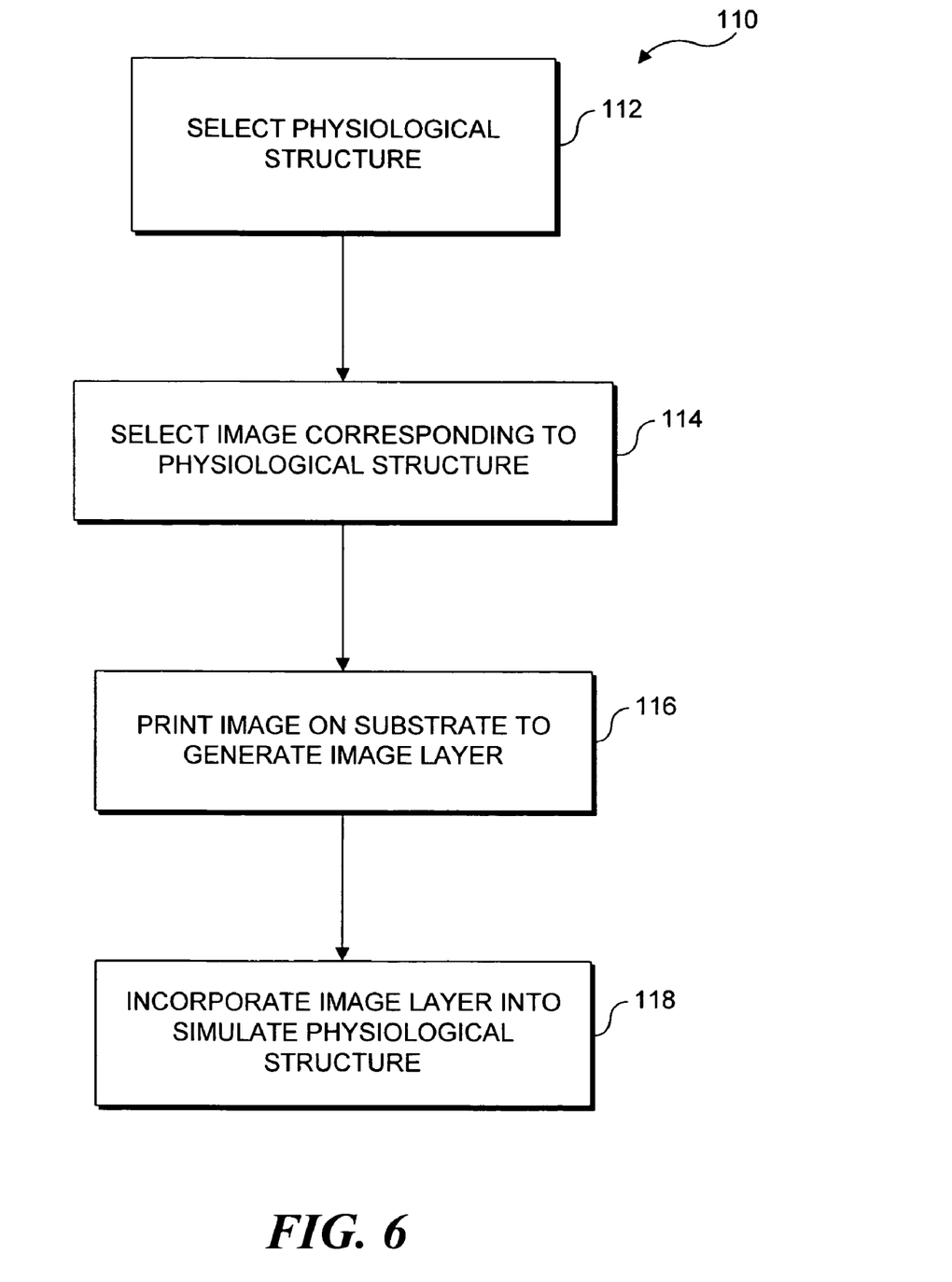
FIG. 6 is a block diagram of the logical steps employed to produce a simulated physiological structure including an image layer in accord with the present invention.

FIG. 6 is a flow chart 110 showing the overall basic steps implemented to produce a simulated physiological structure or medical model including an image layer, in accord with the present invention. In a block 112, a specific physiological structure is selected. In a block 114, an image corresponding to the specific physiological structure is selected. The image can be captured with a conventional or digital camera from an actual physiological structure, or the image can be an anatomically correct rendering of the selected physiological structure. If the physiological structure is intended to include a simulated disease condition (or wound, or other abnormality), then the image selected should include a corresponding condition or abnormality. As discussed above, a single image can be generated using a plurality of digital images with appropriate image editing software to stitch the images together. Certain physiological structures may require the use of more than one image layer. If so, each required image layer is selected.

In a block 116 the image is printed onto a substrate to generate the image layer. As discussed above, for certain simulated physiological structures, a fibrous substrate is preferred. In such circumstances, the substrate can be a fabric, preferably a mesh fabric, such as nylon. Other fabrics, such as SPANDEX™ or LYCRA™, can also be employed. If a reinforcing substrate is not required, a plastic sheet can be employed. Conventional printing technology (e.g., ink jet, laser, offset, or dye sublimatation) can be employed to print the image on the selected substrate. Because generating the desired image may involve manipulating digital images on a computer, a particularly preferred printing technique utilizes an inkjet printer coupled to a personal computer it should be understood that other techniques for forming an image on a substrate can also be beneficially employed, such as photocopying technologies, and the development of latent images formed on light sensitive substrates (i.e. film and photography related technologies). Other types of printing technologies include, but are not limited to, offset lithography, engraving, thermography, reprographics, digital printing, letterpress, screen printing, flexography, and gravure In a block 118, the image layer is incorporated into the simulated physiological structure. This step can involve coupling the image layer to an upper surface of the simulated physiological structure, so that the image layer conforms to any surface irregularities of the simulated physiological structure. If desired, a relatively thin protective elastomeric layer can be added to protect the image layer. Incorporating the image layer into a simulated physiological structure can also involve adding an image layer to a simulated physiological structure when the simulated physiological structure is being fabricated. For example, FIG. 3 shows a simulated human tissue including image layer 28, which rather than being a surface layer, is disposed within the simulated physiological structure. Thus, image layer 28 is added to one or more underlying layers, and then additional layers (either image layers and/or non image layers) are added over image layer 28, to complete the simulated human tissue structure.

Figure 7A:
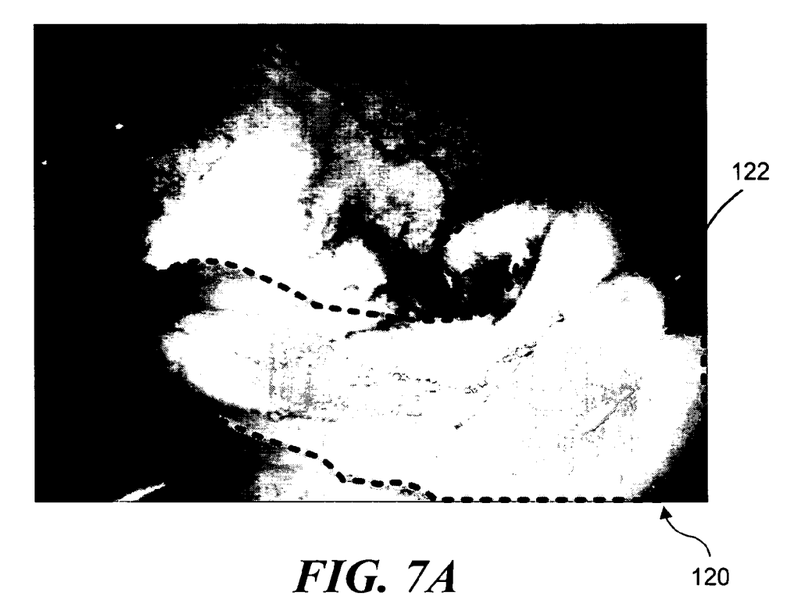
FIG. 7A is an actual image of an appendix.

FIG. 7A is an image 120 of an actual appendix. Portion 122 of image 120 corresponds to the appendix protruding outwardly and away from supporting tissue. To enhance the realism of a simulated physiological structure corresponding to an appendix, the upper surface of the simulated physiological structure preferably includes a protrusion of a similar size and shape, and the image layer incorporated into that simulated physiological structure is generated using a substrate that is sufficiently flexible so that the image layer is able to conform to the protrusion corresponding to the appendix.

Figure 7B:
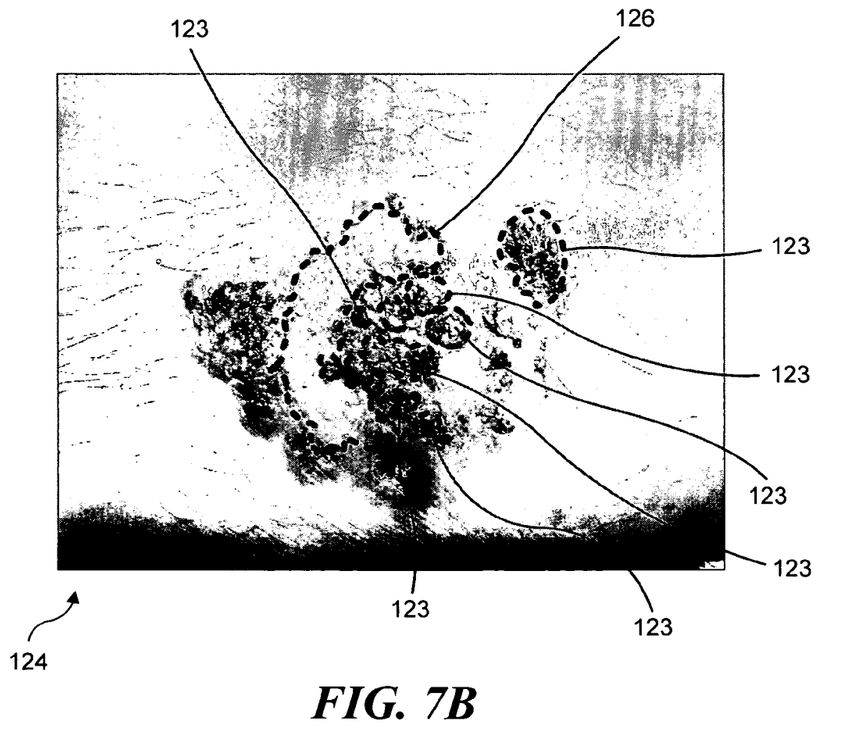
FIG. 7B is an actual image of a skin lesion on a person's leg.

FIG. 7B is an image 124 of an actual ulcer on a person's leg. This type of skin abnormality is referred to as pyoderma gangrenosum, which is characterized by relatively indolent ulcers with extensive necrosis around the edges of the lesions. The ulcers are generally on the lower extremities. The lesions often start as pustules or tender nodules at the site of trauma, and then they gradually increase in size until liquefaction necrosis occurs and an irregular ulcer develops. Portion 126 of image 124 corresponds to a depression in the skin layer caused by such necrosis. Portions 123 of image 124 correspond to pustules or tender nodules protruding from the affected area. Again, to enhance the realism of a simulated physiological structure intended to represent a similar ulcer, the upper surface of the simulated physiological structure preferably includes a depression of a similar size and shape, and protrusions of similar size and shape. The image layer incorporated into the simulated physiological structure is preferably generated using a substrate that is sufficiently flexible so that the image layer is capable of conforming to the depression and protrusions associated with the skin abnormality shown in image 124. It should be understood that some wounds/abnormalities may include only protrusions or depressions, and a simulated physiological structure having only protrusions or depressions can be fabricated to generally correspond to the actual wound/abnormality from which the image was obtained.

Figure 8A:
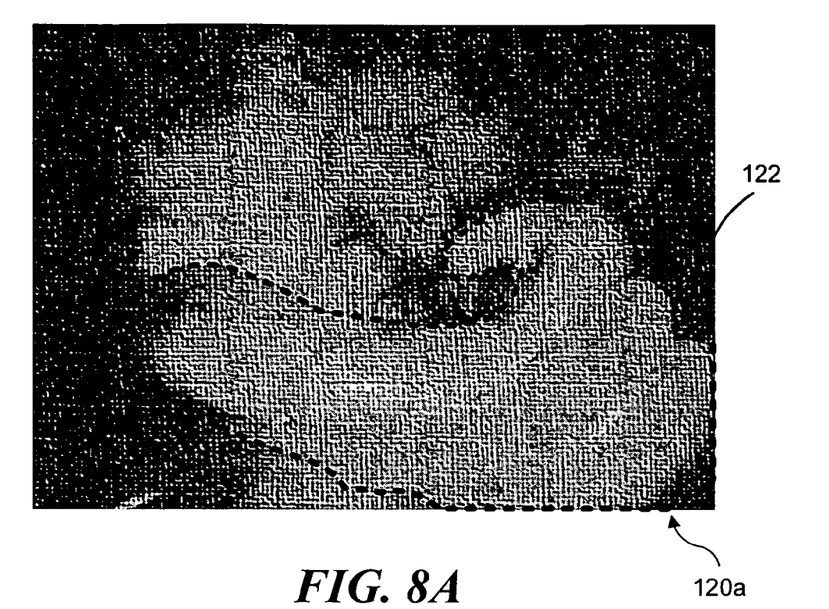
FIGS. 8A and 8B are representations of the images of FIGS. 7A and 7B printed onto fabric substrates to achieve image layers in accord with the present invention.
Figure 8B:
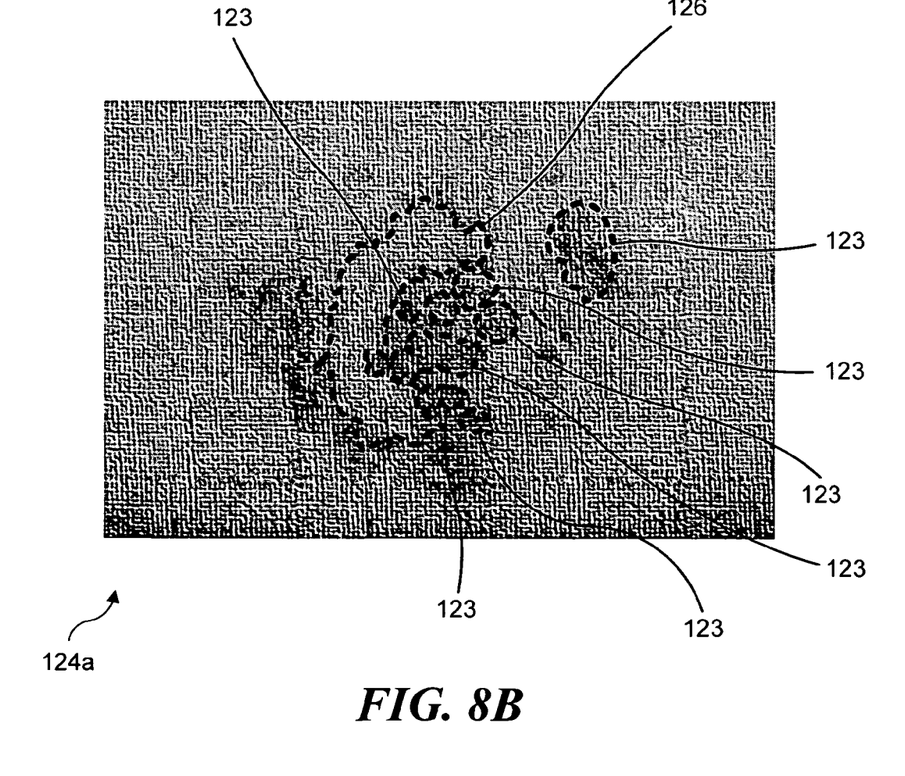

FIG. 8A is an image layer 120a generated using image 120 (FIG. 7A), and FIG. 8B is an image layer 124a generated using image 124 (FIG. 7B). Each image is printed onto a sheet of fabric (note the texture of the fabric is apparent in image layers 120a and 124a) to achieve the corresponding image layer. While the use of a fabric for the substrate results in some loss of resolution (primarily due to the weave of the fabric), the resulting image layer is still very realistic. Corresponding simulated physiological structures can be prepared from one or more layers of elastomeric materials with surface irregularities formed into an upper elastomeric layer, where such surface irregularities generally correspond to portions 122, 123 and 126. Image layers 120a and 124a can be incorporated into such corresponding simulated physiological structures, either by adhesively attaching the image layer to a corresponding simulated physiological structure, or by including the image layer in a mold while the corresponding simulated physiological structure is cast, as described above. A proof of concept simulated tissue structure has been produced, using an image layer generally similar to image layer 124*a*. The use of real images in the image layer, and the contours of the underlying elastomeric layer, enabled a strikigly realistic simulated tissue structure to be achieved. While this empirical proof of concept produced a simulated human tissue structure including only two layers (the image layer and a single elastomeric layer), multilayered tissue structures (without an image layer) have already been achieved, and thus, it is relatively easy to incorporate an image layer into such a multilayered simulated tissue structure.

Although the present invention has been described in connection with the preferred form of practicing it and modifications thereto, those of ordinary skill in the art will understand that many other modifications can be made to the present invention within the scope of the claims that follow. Accordingly, it is not intended that the scope of the invention in any way be limited by the above description, but instead be determined entirely by reference to the claims that follow.

The invention in which an exclusive right is claimed is defined by the following:

1. A physiological training simulator suitable for training personnel, comprising at least one simulated physiological structure and an image layer disposed inside of the simulator with an edged tool to expose the image layer, with simulated physiological structure such that viewing the image layer requires using an endoscopic tool to view an interior portion of the simulated physiological structure, the image layer comprising a substrate onto which an image has been formed, said substrate being at least one substrate selected from the group of substrates consisting of:
   (a) a fabric that is sufficiently thin and flexible such that the image layer can conform to an irregular surface; and
   (b) a mesh that is sufficiently thin and flexible such that the image layer can conform to an irregular surface.

2. A simulated physiological structure comprising:
   (a) a first image layer comprising a first substrate and a first image formed upon the first substrate;
   (b) a second image layer comprising a second substrate and a second image formed upon the second substrate, wherein one of the first and second substrates exhibits a relatively larger resistance to incision than the other substrate; and
   (c) an elastomeric layer disposed between the first and second image layers, said elastomeric layer being sufficiently transparent that at least some of the second image can be discerned when viewed through the first image layer and the elastomeric layer.

3. The simulated physiological structure of claim 2, wherein the simulated physiological structure comprises a simulated tissue structure, and:
   (a) the first image comprises a skin image; and
   (b) the second image comprises a vascular image.

4. The simulated physiological structure of claim 2, wherein the simulated physiological structure comprises a simulated tissue structure, the first image comprises a skin image, and the first substrate exhibits the relatively larger resistance to incision than the second substrate.

5. A method for making a simulated tissue structure including a plurality of elastomeric layers and at least one fiber reinforcing layer, the fiber reinforcing layer making it more difficult to generate an incision into the simulated layered tissue structure than it would be absent the fiber reinforcing layer, comprising the steps of:
   (a) selecting an anatomically appropriate image based on an intended position of the fiber reinforcing layer in the simulated tissue structure;
   (b) printing the image onto the fiber reinforcing layer; and
   (c) incorporating the fiber reinforcing layer with the printed image into the simulated tissue structure, such that the fiber reinforcing layer is disposed inside of the simulated tissue structure and exposing the image layer requires cutting into the simulated tissue structure to access the fiber reinforcing layer.

6. The method of claim 5, wherein the step of printing the image onto the fiber reinforcing layer comprises the step of printing the image onto a material selected from a group of materials consisting of:
   (a) a fabric that is sufficiently thin and flexible such that the fiber reinforcing layer can conform to an irregular surface; and
   (b) a mesh that is sufficiently thin and flexible such that the fiber reinforcing layer can conform to an irregular surface.

7. The simulated tissue structure of claim 5, wherein the fiber reinforcing layer comprises a material selected from a group of materials consisting of:
   (a) a fabric that is sufficiently thin and flexible such that the fiber reinforcing layer can conform to an irregular surface; and
   (b) a mesh that is sufficiently thin and flexible such that the fiber reinforcing layer can conform to an irregular surface.

8. A physiological training simulator suitable for training personnel, comprising at least one simulated physiological structure including an image layer, the image layer being disposed inside of the simulated physiological structure such that viewing the image layer requires the use of an endoscopic tool to view an interior portion of the simulated physiological structure, the image layer comprising a substrate onto which the image is printed, the substrate being selected from a group of substrates consisting of:
   (a) a fabric that is sufficiently thin and flexible such that the image layer can conform to an irregular surface;
   (b) a mesh that is sufficiently thin and flexible such that the image layer can conform to an irregular surface; and
   (c) a polymeric substrate that is sufficiently thin such that a sheet of the polymeric substrate can be printed upon using a printer compatible with standard printer paper.

9. The simulator of claim 8, wherein the image layer corresponds to at least one of a normal esophagus, an esophageal stricture, a normal stomach lining, and an abnormal stomach lining.

10. A physiological training simulator suitable for training personnel, comprising at least one simulated physiological structure including an image layer, the image layer being disposed inside of the simulated physiological structure such that accessing the image layer requires cutting into the simulated physiological structure with an edged tool to expose the image layer, the image layer comprising a substrate onto which the image is printed, the substrate being selected from a group of substrates consisting of:
   (a) a fabric that is sufficiently thin and flexible such that the image layer can conform to an irregular surface;
   (b) a mesh that is sufficiently thin and flexible such that the image layer can conform to an irregular surface; and (c) a polymeric substrate that is sufficiently thin such that a sheet of the polymeric substrate can be printed upon using a printer compatible with standard printer paper.

11. The simulator of claim 10, wherein the image layer is incorporated into a simulated internal organ.

12. The simulator of claim 11, wherein the simulated internal organ comprises an appendix.

* * * * *